(12) United States Patent
Lundström et al.

(10) Patent No.: US 10,961,891 B2
(45) Date of Patent: Mar. 30, 2021

(54) METHOD AND SYSTEM FOR DIAGNOSING AN AFTERTREATMENT COMPONENT SUBJECTED TO AN EXHAUST GAS STREAM

(71) Applicant: Scania CV AB, Södertälje (SE)

(72) Inventors: Mikael Lundström, Hägersten (SE); Ola Stenlåås, Södertälje (SE)

(73) Assignee: Scania CVAB, Södertälje (SE)

( * ) Notice: Subject to any disclaimer, the term of this patent is extended or adjusted under 35 U.S.C. 154(b) by 238 days.

(21) Appl. No.: 16/316,310

(22) PCT Filed: Jun. 14, 2017

(86) PCT No.: PCT/SE2017/050632
§ 371 (c)(1),
(2) Date: Jan. 8, 2019

(87) PCT Pub. No.: WO2018/013031
PCT Pub. Date: Jan. 18, 2018

(65) Prior Publication Data
US 2021/0033012 A1    Feb. 4, 2021

(30) Foreign Application Priority Data
Jul. 14, 2016    (SE) ...................................... 1651062

(51) Int. Cl.
*F01N 3/20*    (2006.01)
*F01N 11/00*    (2006.01)
(Continued)

(52) U.S. Cl.
CPC ............. *F01N 3/208* (2013.01); *B01D 53/30* (2013.01); *B01D 53/9418* (2013.01);
(Continued)

(58) Field of Classification Search
CPC .......... F01N 3/208; F01N 11/00; F01N 3/106; F01N 2550/02; F01N 2550/03;
(Continued)

(56) References Cited

U.S. PATENT DOCUMENTS 7,987,661 B2    8/2011 Jung
9,010,087 B1    4/2015 Upadhyay et al.
(Continued)

FOREIGN PATENT DOCUMENTS

CN    1981915 A    6/2007
CN    101344028 A    1/2009
(Continued)

OTHER PUBLICATIONS

International Preliminary Report on Patentability for International Patent Application No. PCT/SE2017/050632 dated Jan. 15, 2019.
(Continued)

*Primary Examiner* — Brandon D Lee
(74) *Attorney, Agent, or Firm* — Moore & Van Allen PLLC; W. Kevin Ransom

(57) ABSTRACT

A method for diagnosing an aftertreatment component, wherein nitrogen oxide is reduced using a first catalytic converter upstream said aftertreatment component and a second catalytic converter downstream said aftertreatment component, said aftertreatment component oxidizing nitric oxide into nitrogen dioxide. A first sensor measure nitrogen oxide downstream said first catalytic converter but upstream said aftertreatment component, and a second sensor measure nitrogen oxide downstream said aftertreatment component. The method includes: supplying additive upstream said first catalytic converter; using said first and second sensors, performing a first measurement at a first temperature of said first aftertreatment component; using said first and second sensors, performing a second measurement at a second
(Continued)

temperature of said first aftertreatment component; and diagnosing oxidation of nitric oxide into nitrogen dioxide in said aftertreatment component using said first and second measurements.

22 Claims, 4 Drawing Sheets

(51) Int. Cl.
- *F01N 3/10* (2006.01)
- *B01D 53/30* (2006.01)
- *B01D 53/94* (2006.01)

(52) U.S. Cl.
CPC ......... *B01D 53/9495* (2013.01); *F01N 3/106* (2013.01); *F01N 11/00* (2013.01); *B01D 2255/904* (2013.01); *F01N 2550/02* (2013.01); *F01N 2550/03* (2013.01); *F01N 2610/02* (2013.01); *F01N 2900/1402* (2013.01); *F01N 2900/1602* (2013.01)

(58) Field of Classification Search
CPC ......... F01N 2610/02; F01N 2900/1602; F01N 2900/1402; B01D 53/30; B01D 53/9418; B01D 53/9495; B01D 2255/904
See application file for complete search history.

(56) References Cited

U.S. PATENT DOCUMENTS

| | | | |
|---|---|---|---|
| 9,132,386 | B2 | 9/2015 | Udd et al. |
| 9,492,788 | B2 | 11/2016 | Gaudin |
| 9,494,096 | B2 | 11/2016 | Pfaffinger |
| 9,593,611 | B2 | 3/2017 | Kawaguchi et al. |
| 9,593,617 | B2 | 3/2017 | Veldten et al. |
| 9,624,804 | B2 | 4/2017 | Matsumoto et al. |
| 9,657,629 | B2 * | 5/2017 | Iwatani ............... F01N 3/208 |
| 10,052,588 | B2 | 8/2018 | Tanioka |
| 2004/0040284 | A1 | 3/2004 | Upadhyay et al. |
| 2005/0103000 | A1 | 5/2005 | Nieuwstadt et al. |
| 2007/0160508 | A1 | 7/2007 | Doumeki et al. |
| 2008/0271437 | A1 | 11/2008 | Matsunaga |
| 2009/0217644 | A1 | 9/2009 | Jung |
| 2009/0277159 | A1 | 11/2009 | Driscoll et al. |
| 2010/0043397 | A1 | 2/2010 | Wang et al. |
| 2010/0218487 | A1 | 9/2010 | Wang et al. |
| 2010/0326051 | A1 | 12/2010 | Busch et al. |
| 2011/0146239 | A1 | 6/2011 | Handler et al. |
| 2012/0233986 | A1 | 9/2012 | Geveci et al. |
| 2013/0232958 | A1 | 9/2013 | Ancimer et al. |
| 2013/0298655 | A1 | 11/2013 | Kowalkowski et al. |
| 2013/0338900 | A1 | 12/2013 | Ardanese et al. |
| 2014/0065041 | A1 | 3/2014 | Szailer et al. |
| 2014/0127100 | A1 | 5/2014 | Gerhart et al. |
| 2014/0223886 | A1 | 8/2014 | Khaled et al. |
| 2014/0373511 | A1 | 12/2014 | Osburn et al. |
| 2015/0040543 | A1 | 2/2015 | Shetney et al. |
| 2015/0209730 | A1 | 7/2015 | Blanckenfiell et al. |
| 2015/0247435 | A1 | 9/2015 | Garimella et al. |
| 2015/0273395 | A1 | 10/2015 | Catalogna et al. |
| 2016/0069243 | A1 | 3/2016 | Hegemann et al. |
| 2016/0186630 | A1 | 6/2016 | Osburn et al. |
| 2017/0122159 | A1 | 5/2017 | Bahrami |
| 2017/0130629 | A1 | 5/2017 | Nagel et al. |

FOREIGN PATENT DOCUMENTS

| | | | |
|---|---|---|---|
| CN | 103764565 A | | 4/2014 |
| CN | 104053871 A | | 9/2014 |
| CN | 104220710 A | | 12/2014 |
| CN | 104343512 A | | 2/2015 |
| CN | 104603412 A | | 5/2015 |
| CN | 104813002 A | | 7/2015 |
| DE | 102007040439 A1 | | 3/2009 |
| DE | 102011003084 A1 | | 7/2012 |
| DE | 102012211703 A1 | | 1/2014 |
| DE | 102013209487 A1 | | 11/2014 |
| EP | 2918805 A1 | | 9/2015 |
| EP | 2977578 A1 | | 1/2016 |
| EP | 3009622 A1 | | 4/2016 |
| JP | H09189214 A | | 7/1997 |
| JP | 2013130120 A | | 4/2016 |
| JP | 2016098682 A | | 5/2016 |
| KR | 10-2015-0023931 A | | 3/2015 |
| WO | 2014014399 A1 | | 1/2014 |
| WO | 2015046276 A1 | | 4/2015 |
| WO | 2015115978 A1 | | 8/2015 |
| WO | 2016010558 A1 | | 1/2016 |

OTHER PUBLICATIONS

International Search Report for International Patent Application No. PCT/SE2017/050632 dated Sep. 5, 2017.
Written Opinion of the International Searching Authority for International Patent Application No. PCT/SE2017/050632 dated Sep. 5, 2017.

* cited by examiner

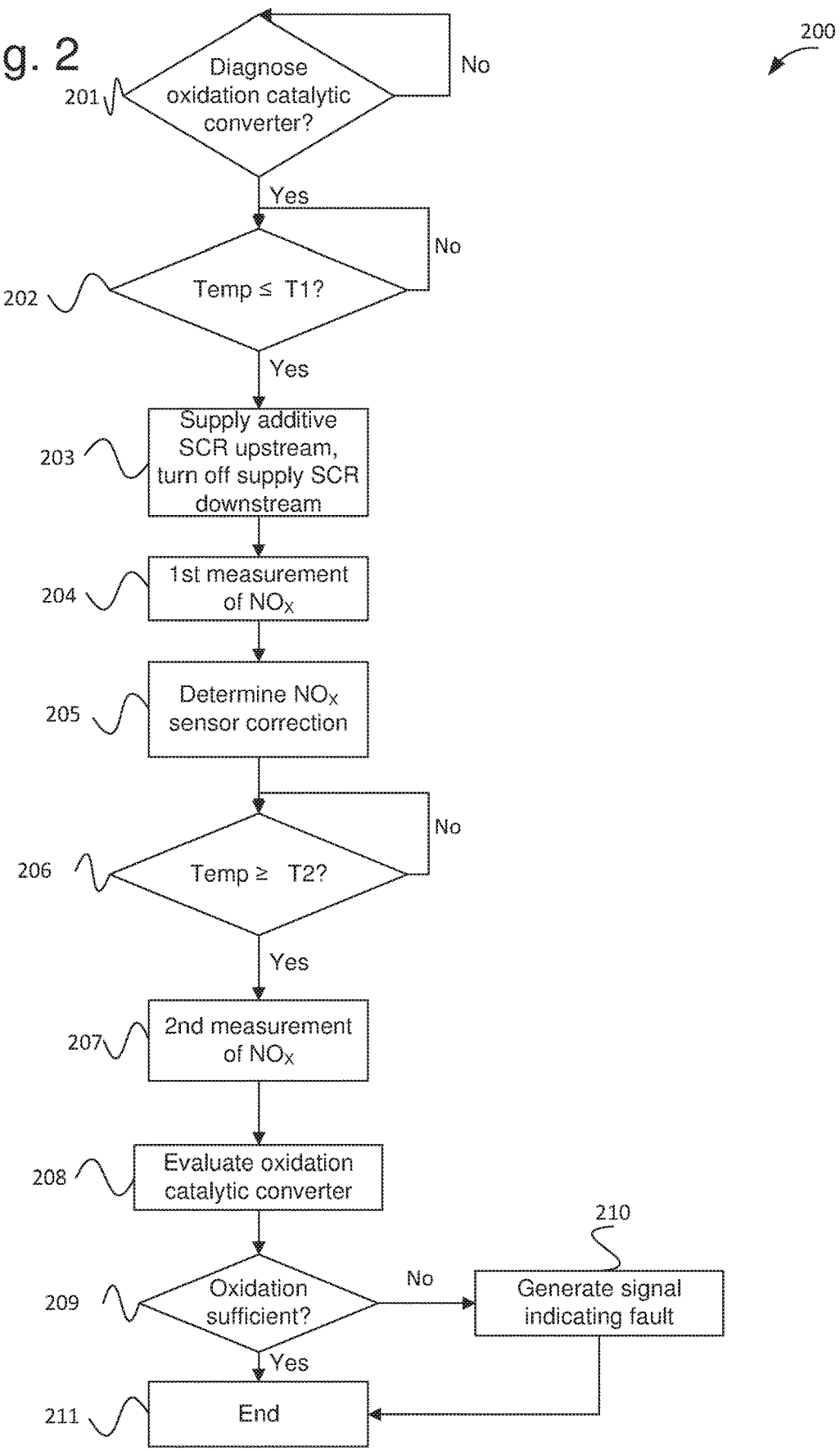

METHOD AND SYSTEM FOR DIAGNOSING AN AFTERTREATMENT COMPONENT SUBJECTED TO AN EXHAUST GAS STREAM

CROSS-REFERENCE TO RELATED APPLICATIONS

This application is a national stage application (filed under 35 § U.S.C. 371) of PCT/SE2017/050632, filed Jun. 14, 2017 of the same title, which, in turn, claims priority to Swedish Application No. 1651062-0 filed Jul. 14, 2016; the contents of each of which are hereby incorporated by reference.

FIELD OF THE INVENTION

The present invention relates to combustion processes, and in particular to methods and systems for diagnosing an aftertreatment component being arranged to oxidize nitric oxides in an exhaust gas stream resulting from combustion. The present invention also relates to a vehicle, as well as a computer program and a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with internal combustion engines. For example, the exhaust levels of e.g. nitrogen oxides ($NO_x$), hydrocarbons (HC), carbon monoxide (CO) and particles are regulated for most kinds of vehicles in these standards.

The undesired emission of substances can be reduced by reducing fuel consumption and/or through the use of aftertreatment (purifying) of the exhaust gases that results from the combustion process.

Exhaust gases from the internal combustion engine can, for example, be treated through the use of one or more catalytic processes. There exist various kinds of catalytic converters, where different types can be used for different kinds of fuel and/or for treatment of different kinds of substances occurring in the exhaust gas stream. With regard to at least nitrogen oxides $NO_x$ (such as nitric oxide NO and nitrogen dioxide $NO_2$) heavy vehicles often comprises a method where an additive is supplied to the exhaust gas stream. The additive is supplied in order to, usually through the use of a catalytic converter, reduce the presence of nitrogen oxides $NO_x$ to less pollutive substances (mainly nitrogen and water vapour). The additive can be injected into the exhaust gas stream resulting from combustion in the internal combustion engine upstream the catalytic converter, and one common type of catalytic converter that is used in nitrogen oxide $NO_x$ reduction of this kind is Selective Catalytic Reduction (SCR) catalytic converters.

Such systems oftentimes also rely on oxidation of nitric oxides into nitrogen oxides in order to reduce the presence of nitrogen oxides $NO_x$ to a desired extent.

SUMMARY OF THE INVENTION

It is an object of the present invention to provide a method and system for diagnosing an aftertreatment component with regard to the capability of oxidising nitric oxide NO into nitrogen dioxide $NO_2$. This object is achieved by a method according to claim 1.

According to the present invention, it is provided a method for diagnosing a first aftertreatment component subjected to an exhaust gas stream resulting from combustion in an internal combustion engine, wherein nitrogen oxide $NO_X$ in said exhaust gas stream is reduced through the use of a first catalytic converter upstream said first aftertreatment component and a second catalytic converter downstream said first aftertreatment component, said first aftertreatment component being arranged for oxidation of nitric oxide NO into nitrogen dioxide $NO_2$, wherein a first sensor is arranged to measure an occurrence of nitrogen oxide $NO_X$ downstream said first catalytic converter but upstream said first aftertreatment component, and wherein a second sensor is arranged to measure an occurrence of nitrogen oxide $NO_X$ downstream said first aftertreatment component. The method includes:

supplying additive upstream said first catalytic converter to reduce nitrogen oxide $NO_X$ through the use of said first catalytic converter, using said first and second sensors, performing a first measurement, respectively, of the occurrence of nitrogen oxide $NO_X$ at a first temperature of said first aftertreatment component, using said first and second sensors, performing a second measurement, respectively, of the occurrence of nitrogen oxide $NO_X$ at a second, different from said first, temperature of said first aftertreatment component, and diagnosing oxidation of nitric oxide NO into nitrogen dioxide $NO_2$ in said first aftertreatment component using said first and second measurements.

The first aftertreatment component may, for example, consist of an oxidation catalytic converter, or any other kind of aftertreatment component, such as a catalytic converter, being adapted to oxidize nitric oxide NO into nitrogen dioxide $NO_2$. The desired effect can be obtained e.g. by providing at least a portion of substantially any aftertreatment component with a suitable catalytic coating being capable of oxidising nitric oxides into nitrogen dioxide $NO_2$. For example, the first aftertreatment component may e.g. be form part of a slip catalytic converter, a reduction catalytic converter, or a particle filter.

As was mentioned above, the presence of at least some substances in an exhaust gas stream resulting from combustion can be reduced through the supply of an additive to the exhaust gas stream. A reagent of the additive then reacts with one or more of the substances occurring in the exhaust gas stream to thereby form less hazardous substances.

The present invention relates to systems where supply of additive is being used to reduce the concentration of nitrogen oxides $NO_x$ in the exhaust gases resulting from combustion. With regard to such supply of additive it is important that the reagent is supplied to the exhaust gas stream in a proportion that corresponds to the presence of nitrogen oxides that is to be reduced in order to achieve the desired effect. It is also essential that the additive comprises a reagent of a kind that is capable of performing the desired reduction. If a wrong kind of reagent/additive is supplied, and/or if the supplied amount of additive is too small in relation to the presence of the substance/composition to be reduced, undesired surplus of nitrogen oxides may still remain after the reduction and be emitted into the surroundings.

With regard to supply of additive, this is oftentimes performed on the basis of a measured or estimated occurrence of nitrogen oxides upstream the one or more reduction catalytic converters. Furthermore, there is, in general, feedback from a measured occurrence downstream the reduction catalytic converters through the use of a sensor measuring the occurrence of nitrogen oxides in the exhaust gas stream prior to leaving the vehicle. This feedback is a measure of the combined occurrence of nitric oxides and nitrogen dioxide $NO_2$ in the exhaust gas stream.

However, with regard to the operation of such systems, it is oftentimes also essential that nitric oxides NO are oxidized to a desired extent prior to the exhaust gas stream reaching the second reduction catalytic converter in order to obtain a desired total reduction of nitrogen oxides $NO_X$ in the exhaust gas stream. This may in general be the case for as long as the aftertreatment component that carries out all or the majority of the oxidation of nitric oxides NO is operating properly. When this is not the case, however, the reduction of nitrogen oxides may not occur fully to a desired extent, i.e. the degree of oxidation may be lower than a desired degree of oxidation.

According to the invention it is provided a method for diagnosing such oxidation of nitric oxides NO into nitrogen dioxide $NO_2$ by an aftertreatment component in a system utilising a first and a second reduction catalytic converter for reducing nitrogen oxide $NO_X$ in an exhaust gas stream, and where a first aftertreatment component is arranged in between said first and second reduction catalytic converters, and where said first aftertreatment component is arranged for oxidation of nitric oxide NO into nitrogen dioxide $NO_2$.

According to the invention, additive is supplied upstream the first reduction catalytic converter in order to reduce nitrogen oxide $NO_X$ through the use of said first reduction catalytic converter. The relation between nitric oxide NO and nitrogen dioxide $NO_2$ in an exhaust gas stream leaving an internal combustion engine is normally such that the relative proportion of nitrogen dioxide $NO_2$ is in the order of 10+−5 percent of the total content of nitrogen oxide $NO_X$ in the exhaust gas stream. Hence, through supply of a relatively limited amounts of additive upstream the first reduction catalytic converter, the nitrogen dioxide $NO_2$ content in the exhaust gas stream can be reduced to essentially zero. The reason for this is the chemistry prevailing in reduction catalytic converters. As is well known, the fastest of the main three chemical reactions that occur in a reduction catalytic converter is a reaction where nitric oxide NO and nitrogen dioxide $NO_2$ are reduced at the same rate. Hence, if additive is supplied in an amount sufficient to obtain a degree of conversion being equal to or exceeding twice the content of nitrogen dioxide $NO_2$, nitrogen oxides leaving the reduction catalytic converter will, in principle, consist of nitric oxides only, or at least it can be ensured that the already low content of nitrogen dioxide $NO_2$ can be reduced to a large extent. The first reduction catalytic converter may be designed such that it is capable of reducing only a portion of the total content of nitrogen oxides in the exhaust gas stream leaving the internal combustion engine, but which may still be sufficient to reduce nitrogen oxides to an extent such that all nitrogen dioxide $NO_2$ is reduced.

Supply of additive according to the above may hence have the result that the relative proportion of nitrogen dioxide $NO_2$ in relation to nitric oxide NO when entering said first aftertreatment component will be low or even non-existent. Nitric oxides may then be oxidized in said first aftertreatment component, thereby again creating an occurrence off nitrogen oxides in the exhaust gas stream. In order for such oxidation to occur to any significant extent, however, it is required that said first aftertreatment component is heated at least to a minimum temperature limit. This fact is utilized by the present invention.

Measurements of the occurrence of nitrogen oxide $NO_X$ is performed at a first temperature, using a first and a second sensor, where the first sensor is arranged to measure an occurrence of nitrogen oxide $NO_X$ downstream said first reduction catalytic converter but upstream said first aftertreatment component, i.e. oxidising component, and wherein a second sensor is arranged to measure an occurrence of nitrogen oxide downstream said first aftertreatment component, such as upstream or downstream said second reduction catalytic converter. Said first measurements hence include a measurement by each of said sensors.

The first temperature can be arranged to represent a temperature of said first aftertreatment component at which oxidation of nitric oxide NO into nitrogen dioxide $NO_2$ in said first aftertreatment component occurs to an extent below a first extent. For example, the first temperature may represent a temperature where there is essentially no oxidation of nitric oxides into nitrogen dioxide $NO_2$ in said first aftertreatment component.

A second measurement is performed, by each of said first and second sensors, of the occurrence of nitrogen oxide $NO_X$ at a second, different from said first, temperature. The oxidation of nitric oxide NO into nitrogen dioxide $NO_2$ in said first aftertreatment component is then diagnosed using said first and second measurements.

The second temperature may represent a temperature of said first aftertreatment component at which oxidation of nitric oxide NO into nitrogen dioxide $NO_2$ in said first aftertreatment component occurs to an extent above a second, higher than said first, extent. For example, the second temperature may constitute a representation of a temperature of said first aftertreatment component such high that oxidation of nitric oxide NO into nitrogen dioxide $NO_2$ occurs in said first aftertreatment component at least to a predetermined degree of oxidation, e.g. a temperature where the expected oxidation is such that the oxidation catalytic converter is oxidising nitric oxides NO at least at 40% of its maximum oxidation, or e.g. such that at least 20% of the nitric oxides NO are oxidized into nitrogen dioxide $NO_2$, or a temperature where a maximum degree of oxidation of nitric oxides NO is expected.

Hence, measurements are performed for two different temperatures, at which different degrees of oxidation by said first aftertreatment component is expected. The oxidation capabilities of the first aftertreatment component can be evaluated through the use of these measurements.

The measurements will provide different results when different degrees of oxidation occur at the different temperatures. This is due to the fact that sensor sensitivity of a $NO_X$ sensor differs in regard of nitric oxides NO and nitrogen dioxide $NO_2$. For example, it is common that sensor sensitivity is essentially equal to 1 for measurements of nitric oxides NO, but may be as low as e.g. 0.8 for nitrogen dioxide $NO_2$. Hence, if the nitrogen oxides $NO_X$ consists to a large extent of nitrogen dioxide $NO_2$, the sensor signal would indicate a lower occurrence of nitrogen oxides than when the nitrogen oxides consist to a larger extent of nitric oxide NO, still measuring on the same exhaust gas stream.

Furthermore, the first measurements using said first and second sensor is preferably performed on essentially the same exhaust gas stream with regard to nitrogen oxide $NO_X$ content. This will be the case e.g. when no oxidation occurs in the first aftertreatment component and when the second sensor is being arranged upstream the second reduction catalytic converter. If the second sensor is arranged downstream the second reduction catalytic converter, which oftentimes may be the case, supply of additive to the second reduction catalytic converter may be turned off, and possibly stored additive/reagent in the second reduction catalytic converter be allowed to be consumed so as to eliminate reduction of nitrogen oxides in the second reduction catalytic converter, thereby ensuring measurement on the same nitrogen oxide content.

With regard to said representation of the temperature of the first aftertreatment component this may be arranged to be determined e.g. by one or more temperature sensors at or in the vicinity of the first aftertreatment component. Alternatively, e.g. a model representation of the exhaust treatment system may be utilized to estimate the temperature, e.g. through the use of one or more temperature sensors upstream and/or downstream the first aftertreatment component. Also, empirical measurements may be utilized.

With regard to said first measurements, the measurements by the first and second sensor can be compared, and since the sensors are measuring on the same exhaust gas stream, differences in measurement result can be contributed to a difference in sensor accuracy. In addition to the difference in sensor sensitivity explained above, the sensors may also differ with regard to sensor accuracy, where the sensors may indicate both too high and too low occurrences. When measuring on the same exhaust gas stream, the difference in sensor signals from the first and second sensor can be used as a measure of a difference in sensor accuracy of the first and second sensor.

A representation of the difference in sensor accuracy can then be utilized when determining a measurement difference between a second measurement of said second sensor and a second measurement of said first sensor at said second temperature. That is, the second measurement difference can be compensated using the first measurement difference, so that differences in sensor accuracy does not erroneously influence the diagnosis of the first aftertreatment component.

The first aftertreatment component can be diagnosed with regard to oxidation of nitric oxide NO into nitrogen dioxide $NO_2$ in said first aftertreatment component on the basis of the second measurement difference, where a lower measurement of said second sensor in relation to a measurement of said first sensor, when compensated for sensor accuracy, can be used as indication of ongoing oxidation of nitric oxides, where the second measurement result will be lower the higher the oxidation is. When compensating the measurements for sensor accuracy, the first aftertreatment component can be diagnosed with high accuracy, and also the extent to which oxidation is occurring can be determined. According to embodiments of the invention, the diagnose can be repeated over time so that changes, e.g. degradations, over time of the first aftertreatment component can be evaluated and also compensated for, e.g. by increasing a supply of additive for a given occurrence of nitrogen oxides $NO_X$ in the exhaust gas stream to account for slower reactions occurring to a higher extent.

When diagnosing the first aftertreatment component, it can be determined if said second measurement using said second sensor deviates from said second measurement using said first sensor, when measurements are compensated, at least to a first extent, and when this is the case it can be determined that the first aftertreatment component is operating properly. Hence, it can be required at least a minimum difference, and hence a minimum oxidation, in order to declare proper operation. Since oftentimes sensor sensitivity is higher when detecting presence of nitric oxides NO than when detecting presence of nitrogen dioxide $NO_2$, the first aftertreatment component can be determined to operate properly when said compensated second measurement of said first sensor exceeds said compensated second measurement of said second sensor at least to said first extent.

Conversely, it can be determined if an estimated occurrence of nitrogen dioxide $NO_2$ in said exhaust gas stream downstream said second catalytic converter is below a predetermined occurrence of nitrogen dioxide $NO_2$, and when this is the case it can be determined that the first aftertreatment component is not operating properly.

The determination may be performed for a plurality of operating points, where it may be required that the first aftertreatment component is not working properly for a plurality of operating points in order to determine an occurrence of a fault.

This may be different operating points e.g. with regard to temperature, where the first aftertreatment component can be diagnosed for a plurality of different temperatures, i.e. the method can be performed for a plurality of different actual temperatures of in particular said second temperature, where oxidation of nitric oxides NO can be evaluated for the different temperatures to determine the performance of said first aftertreatment component.

According to embodiments of the invention, the method is carried out for a plurality of operating points where the exhaust gas mass flow, or in particular the mass flow of nitrogen oxides $NO_X$, differs.

Different mass flows of nitrogen oxide $NO_X$ may have an impact on the operation of the aftertreatment components, and thereby an impact on the diagnosis of said first aftertreatment component according to the invention.

A reason for this is that different mass flows may result in different efficiencies of the aftertreatment components. For example, different mass flows result in different space velocities in the aftertreatment components. If the mass flow is low, the space velocity is more favourable and there is more time for the desired reactions to occur, which may be beneficial from an efficiency point of view. If the mass flow is higher, a larger amount of reactions must take place at the same amount of time, and if the mass flow exceeds the maximum capacity of the aftertreatment component, the desired reactions, such as e.g. oxidation of nitric oxides NO into nitrogen dioxides $NO_2$, may not occur to a full extent. This, in turn, may affect e.g. following reduction in a reduction catalytic converter.

In addition, efficiency of e.g. catalytic converters may deteriorate with increasing age, where such deteriorations may be most, or only, noticeable at higher mass flows where capacity utilisation is higher. For example, the first aftertreatment component may be capable to oxidize nitric oxides NO into nitrogen dioxide $NO_2$ to a sufficient extent at lower mass flows of nitrogen oxides $NO_X$, while this may not be the case at higher mass flows of nitrogen oxides $NO_X$.

According to the invention, diagnose of said first aftertreatment component can be arranged to be performed for a plurality of different mass flows of nitrogen oxides $NO_X$ to diagnose performance of said first aftertreatment component at different mass flows to take into account variations in system operation due to varying mass flows.

The invention may be carried out in a vehicle, and the invention also relates to a system corresponding to the method set forth above. The system is characterised in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

BRIEF DESCRIPTION OF THE DRAWINGS

FIG. 2 illustrates an exemplary method according to embodiments of the invention.

DETAILED DESCRIPTION OF THE INVENTION

In the following detailed description the present invention will be exemplified for a vehicle. The invention is, however, applicable also in other kinds of transportation means, such as air and water crafts. The invention is also applicable in fixed installations.

Figure 1A:
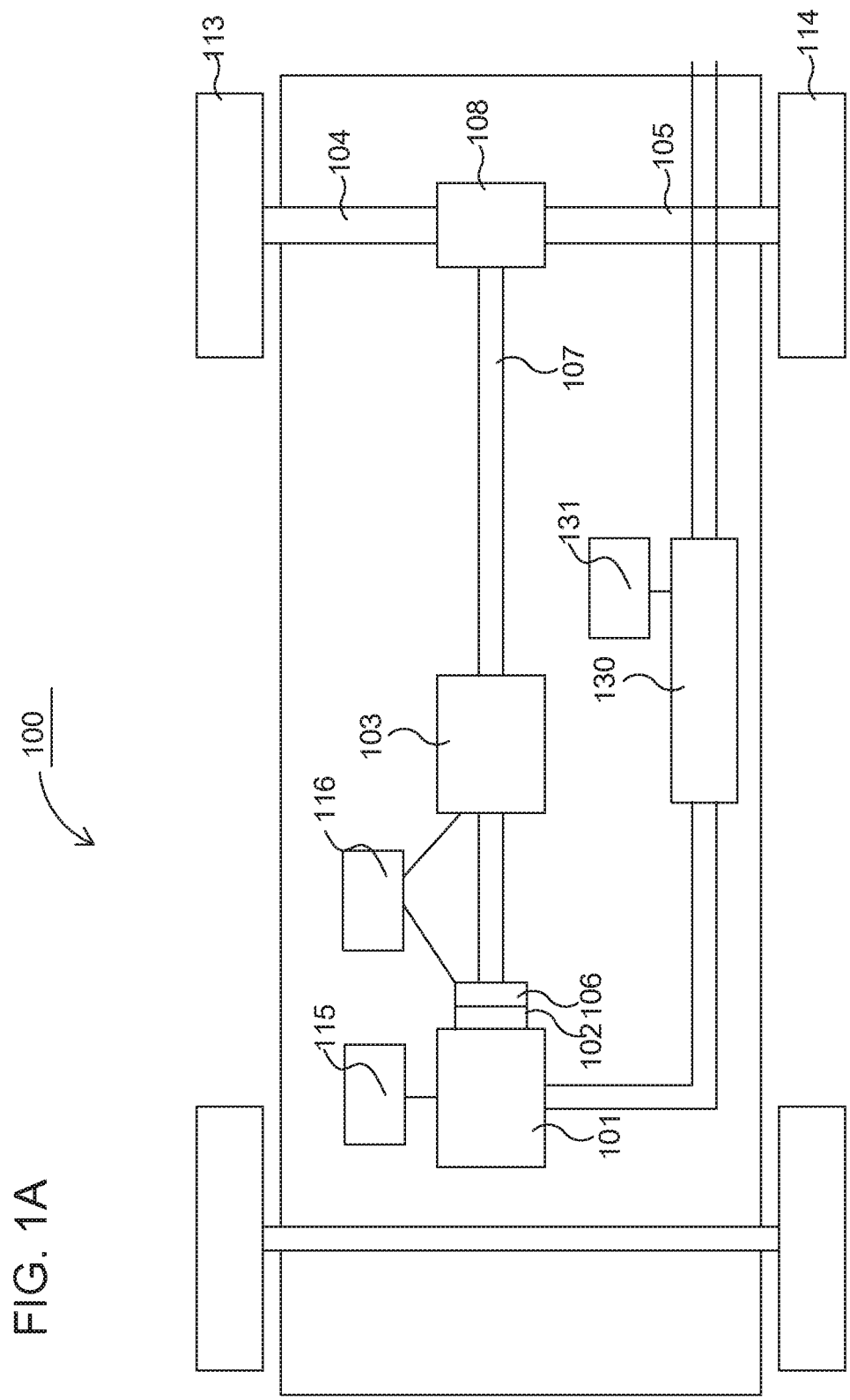
FIG. 1A illustrates a power train of an exemplary vehicle in which the present invention advantageously can be utilized.

FIG. 1A schematically depicts a power train of an exemplary vehicle 100. The power train comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108. The internal combustion engine 101 is controlled by the vehicle control system via a control unit 115.

FIG. 1A, consequently, discloses a powertrain of a specific kind, but the invention is applicable in any kind of power train and also e.g. in hybrid vehicles. The disclosed vehicle further comprises an exhaust treatment system 130 for aftertreatment (purifying) of exhaust gases that results from combustion in the internal combustion engine 101. The functions of the exhaust treatment system 130 are controlled by means of a control unit 131.

The exhaust treatment system 130 can be of various kinds and designs, and according to the disclosed embodiment an additive is supplied to the exhaust gas stream. An example of an exhaust treatment system 130 in which the present invention can be utilized is shown more in detail in FIG. 3, which schematically shows the exhaust treatment system 130 connected via an exhaust pipe 302 to the internal combustion engine 101. Exhausts generated by combustion in the internal combustion engine 101, indicated as an exhaust stream by arrows 303 are led to components of the exhaust treatment system 130.

Exhausts generated at combustion in the engine 101 and the exhaust stream 303 (indicated by arrows) are led to a first dosage device 371, arranged to add a first additive into the exhaust stream 303. A first reduction catalytic converter 331 is arranged downstream of the first dosage device 371, e.g. an injection nozzle, forming part of an additive dosing system, which is arranged to supply additive to the exhaust stream 303 for use in the first reduction catalytic converter 331.

The first reduction catalytic converter 331 is arranged to reduce nitrogen oxides $NO_x$ in the exhaust stream 303, through the use of the first additive added to the exhaust stream by the first dosage device 371. The first reduction catalytic converter may, according to embodiments of the invention, at least partly constitute a selective catalytic reduction (SCR) catalytic converter, and may, according to embodiments of the invention, include at least one portion constituting a slip catalytic converter.

The first additive can, as according to the disclosed embodiment, for example, be an additive comprising urea as reagent and e.g. consist of AdBlue which constitutes a frequently used additive and which consists of a mixture of approximately 32.5% urea dissolved in water. Urea forms ammonium when heated, and the ammonium then reacts with nitrogen oxides $NO_x$ in the exhaust gas stream. The present invention is applicable when using AdBlue, as well as when using any other urea based additive, or additive suitable for use in the reduction of nitrogen oxides.

The additive dosing system further comprises an additive tank 376, which is connected to the injection nozzle 371 and also an injection nozzle 372 (see below) via a pump 373. The dosing of additive is controlled by an additive control unit 374, which generates control signals for controlling the supply of additive by controlling nozzles 371 and 372 and pump 373 so that a desired amount is injected into the exhaust gas stream 303 from the tank 376 using the injection nozzles 371, 372.

The exhaust treatment system 130 further comprises means for oxidising nitic oxides NO in the exhaust gas stream, which, according to the present example, constitutes an oxidation catalytic converter 310, which is arranged, inter alia, to oxidize nitrogen oxides $NO_x$. Oxidation catalytic converters may e.g. be utilized also in oxidation of incompletely oxidized carbon compounds in the exhaust stream 303.

The exhaust system 130 further comprises a particulate filter 320 downstream of the oxidation catalytic converter 310, which, in a manner known per se, is arranged to catch and oxidize soot particles. The exhaust gas stream 303 passes through the filter structure of the particulate filter, where soot particles are caught in the filter structure from the passing exhaust stream 303, and are stored and oxidized in the particulate filter.

The oxidation catalytic converter 310 is at least partly coated with a catalytically oxidising coating, wherein such oxidising coating may comprise at least one precious metal, for example platinum. The use of the oxidation catalytic converter 310 in this manner results in an oxidation of nitric oxide NO into nitrogen dioxide $NO_2$, which is beneficial, for example, in regard of the efficiency in soot oxidation in the particulate filter 320. However, the oxidation of nitric oxide NO into nitrogen dioxide $NO_2$ is also advantageous with regard to reduction of nitrogen oxides $NO_x$ through use of additive in a second reduction catalytic converter 332, which also may constitute a selective catalyst reduction (SCR) catalytic converter arranged downstream the particulate filter 320.

The reactions in the oxidation catalytic converter are in general highly temperature dependent, where essentially no reactions may occur when temperature is low. With regard to oxidation of nitric oxide NO into nitrogen dioxide $NO_2$ there may also be an optimum temperature where oxidation occurs to a highest extent, above which oxidation may decrease.

Downstream the particulate filter 320, the exhaust treatment system 130 is equipped with a second dosage device, e.g. an injection nozzle, 372, in the present example forming part of the same additive dosing system as said first dosage device 371, and which is arranged to supply additive to the exhaust stream 303 for use in the second SCR catalytic converter 332. This additive can, as according to the disclosed embodiment, be additive supplied from the same tank as the additive supplied by the first dosage device and hence e.g. consist of AdBlue.

The supply of additive supplied by nozzles 371, 372 can be arranged to be controlled through the use of control unit 374, such that different amounts of additive are supplied by the different nozzles 371, 372, and where anyone or both injection nozzles may be arranged to supply additive at some given point in time. The first and second SCR catalytic converters 331, 332 may also be designed with substantial differences in capacity regarding e.g. reduction of nitric oxides, where, for example, the first (upstream) reduction catalytic converter may be designed with less capacity for reducing nitric oxides in comparison to the second reduction catalytic converter. Furthermore, different additive dosing systems for supply of additive by nozzles 371, 372, respectively, and it is also contemplated that different kinds of additive are supplied from different tanks.

The exhaust treatment system 130 may also be equipped with one or several sensors, such as one or more $NO_x$ sensors 362, 363, 364 and/or one or several temperature sensors (not shown) which are arranged for the determination of $NO_x$ concentrations and temperatures in the exhaust treatment system 130, respectively. $NO_x$ sensor 362 is arranged upstream the oxidation catalytic converter 310 but downstream the first reduction catalytic converter 331. The $NO_X$ sensor 364 is arranged downstream the SCR catalytic converter 332, and provides a measure of the occurrence of nitrogen oxides leaving the vehicle following passage through the exhaust treatment system 130. The $NO_x$ sensor 364 may also be used e.g. for feedback regarding dosage of additive as is known per se.

Dosing systems for the supply of additive are in general well described in the prior art, and the precise manner in which the supply of additive is dosed/performed is therefore not described in detail herein. In general, the dosing varies, in principle, continuously as the operating conditions changes and the generation of nitrogen oxide therewith.

Figure 3:
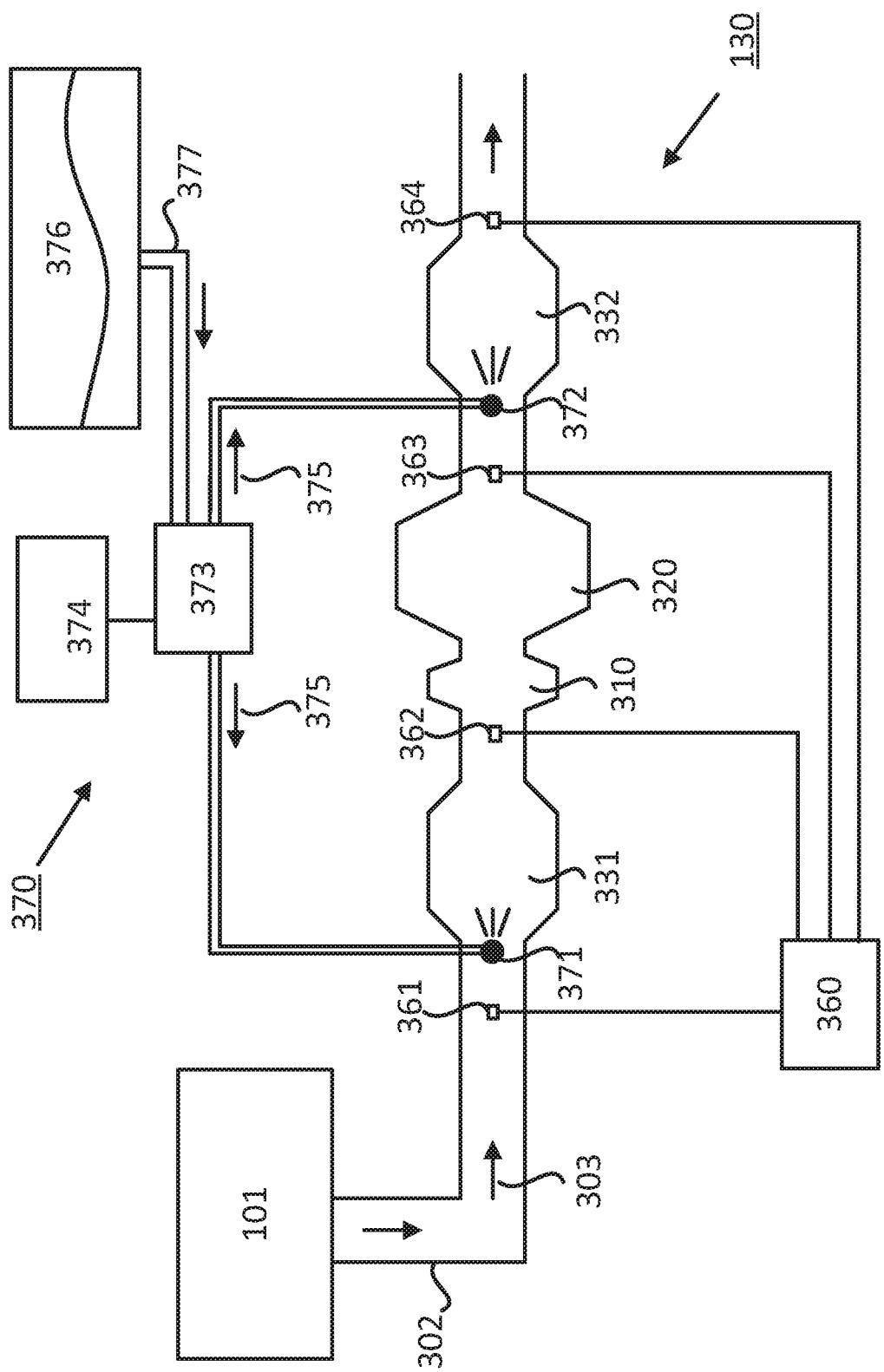
FIG. 3 illustrates an example of an aftertreatment system where a supply of additive is utilized and with which the present invention advantageously can be utilized.

However, as was explained above, optimal functionality of a system of the kind disclosed in FIG. 3 depends on the functionality of the components forming part of the system. For example, it is essential that oxidation of nitric oxides into nitrogen dioxide $NO_2$ in the oxidation catalytic converter occurs to an expected/desired extent.

As was mentioned, with regard to reduction catalytic converters such as SCR catalytic converters, reduction of nitric oxides NO and nitrogen dioxide $NO_2$ occurs according to three main reactions, where according to the fastest reaction nitric oxide NO and nitrogen dioxide $NO_2$ are reduced at a same proportion and rate. When this reaction no longer can occur, e.g. because either the nitric oxide NO or the nitrogen dioxide $NO_2$ has been consumed, further reactions take place at a slower rate, where firstly nitric oxides is reduced, and secondly nitrogen dioxide $NO_2$ is reduced.

Depending on the relative proportions of nitric oxides and nitrogen dioxide $NO_2$ when entering the second SCR catalytic converter 332, the resulting occurrence following the second SCR catalytic converter 332 may be highly dependent on the of oxidation of nitric oxide NO or nitrogen dioxide $NO_2$.

According to the invention, it is provided a method for diagnosing an aftertreatment component such as the oxidation catalytic converter 310 with respect to the capability of oxidising nitric oxides NO into nitrogen dioxide $NO_2$. An exemplary method 200 according to the invention will be described in the following with reference to FIG. 2.

The method according to the invention can be implemented at least partly e.g. in the control unit 374 for controlling of the additive dosing system. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 3 depicts only control units 115, 130, 374, but vehicles 100 of the illustrated kind are often provided with significantly more control units, as one skilled in the art will appreciate. Control units 115, 130, 374 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 374. The correction of the supply of additive according to the present invention will usually depend on signals being received from other control units and/or vehicle components, and it is generally the case that control units of the disclosed type are normally adapted to receive sensor signals from various parts of the vehicle 100. The control unit 374 will, for example, receive signals e.g. from one or more of $NO_X$ sensors 362, 364, e.g. via control unit 131. Control units of the illustrated type are also usually adapted to deliver control signals to various parts and components of the vehicle, e.g. to the engine control unit or control unit 131.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc., and be arranged in or in connection with the control unit, whereupon the computer program is executed by the control unit. The behaviour of the vehicle in a specific situation can thus be adapted by modifying the instructions of the computer program.

Figure 1B:
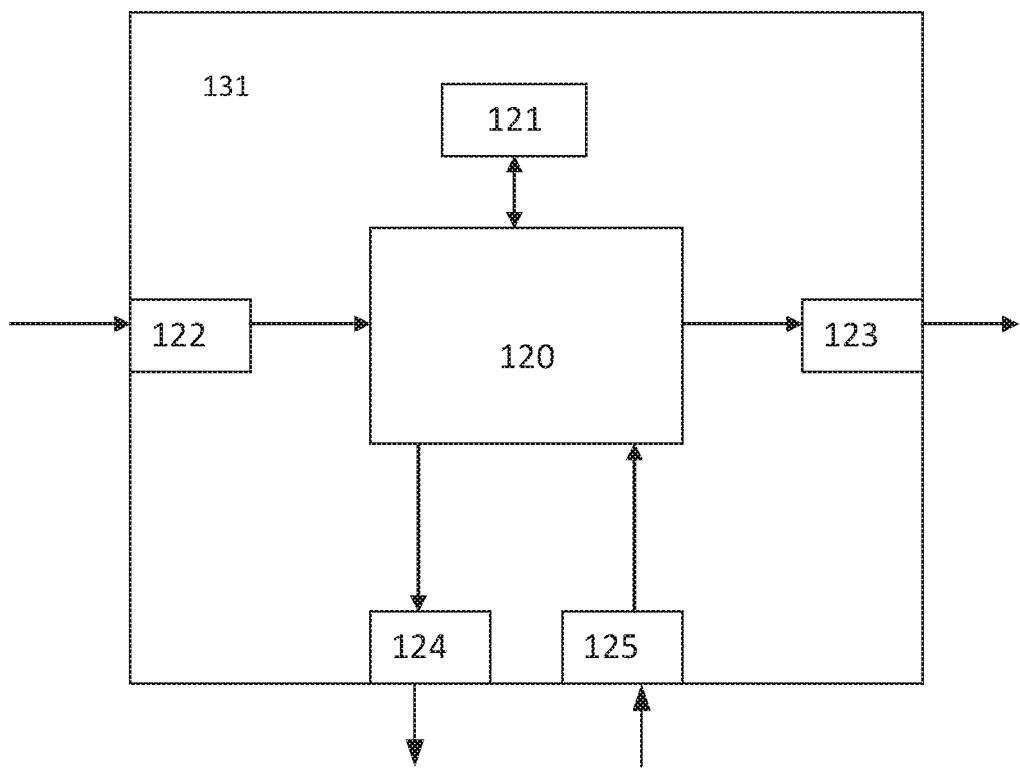
FIG. 1B illustrates an example of a control unit in a vehicle control system.

An exemplary control unit (the control unit 374) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 374 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Returning to the exemplary method 200 illustrated in FIG. 2, the method starts in step 201, where it is determined whether, according to the present example, the oxidation catalytic converter 310 is to be diagnosed with regard to oxidation of nitric oxides NO into nitrogen dioxide $NO_2$. The method remains in step 201 for as long as this is not the case. The method continues to step 202 when it is determined that the oxidation catalytic converter 310 is to be diagnosed.

The transition from step 201 to step 202 can, for example, be initiated according to various criteria. For example, the diagnosis can be arranged to be performed when there is an indication that the system is not operating properly with regard to oxidation of nitrogen oxides $NO_X$ or reduction of $NO_X$ which e.g. can be determined to be the case when e.g. one or more sensors, such as $NO_X$ sensor 364, indicates a presence of nitrogen oxides that deviates from an expected occurrence. According to embodiments of the invention, diagnosis is performed at regular intervals, e.g. to evaluate changes over time with regard to the performance of the oxidation catalytic converter 310.

In step 202 it is determined whether a representation of the temperature of the oxidation catalytic converters 310 is below a first temperature T1. This can be determined, for example, through the use of one or more temperature sensors, e.g. measuring a temperature at any suitable location in the exhaust gas stream. For example, a temperature sensor may be used that measures the temperature of the oxidation catalytic converter directly, but a temperature sensor measuring e.g. a temperature of the exhaust gas stream upstream the aftertreatment components may also be utilized e.g. in a model representation of the exhaust treatment system, so that an estimate of the temperature of the oxidation catalytic converter 310 is obtained.

The first temperature T1 is preferably determined to be a temperature such that essentially no, or only limited, oxidation of nitric oxides NO into nitrogen oxides $NO_2$ occur in the oxidation catalytic converter. For example, this temperature may constitute a temperature of 200° Celsius or less. In general, oxidation in the oxidation catalytic converter is highly temperature dependent, where oxidation is low or non-existent for low temperatures. Hence, by selecting a temperature T1 where little or no oxidation occurs, the exhaust gas stream may be passed through the oxidation catalytic converter without essentially changing the relation between nitric oxides NO and nitrogen dioxide $NO_2$ in the exhaust gas stream.

The method may remain in step 202 for as long as the temperature condition T1 is not fulfilled, and actions may also be taken to achieve the desired temperature. It is also contemplated that this step is performed when driving conditions are such that the temperature of the oxidation catalytic converter is low, e.g. when internal combustion engine load is low and/or prior to the oxidation catalytic converter reaching working temperatures e.g. following a cold start of the vehicle. When the criteria of step 202 is fulfilled the method continues to step 203.

In step 203 additive 376 is supplied upstream the first SCR catalytic converter 331, i.e. the reduction catalytic converter being arranged upstream the oxidation catalytic converter 310, through injection nozzle 371. This is done in order to reduce principally nitrogen dioxide $NO_2$ in the exhaust gas stream. As was mentioned above, the relation between nitric oxide NO and nitrogen dioxide $NO_2$ in an exhaust gas stream leaving an internal combustion engine is such that the relative proportion of nitrogen dioxide $NO_2$ is in the order of 10±5 percent of the total content of nitrogen oxides in the exhaust gas stream.

As was mentioned above, with regard to $NO_X$ reduction, the chemistry prevailing in reduction catalytic converters is such that nitric oxide NO and nitrogen dioxide $NO_2$ primarily are reduced (consumed) at the same rate. Hence, at least if additive is supplied in an amount sufficient to obtain a degree of conversion being equal to or exceeding twice the content of nitrogen dioxide $NO_2$, nitrogen oxides leaving the reduction catalytic converter will essentially consist of nitric oxides only, or at least it can be ensured that the already relatively low content of nitrogen dioxide $NO_2$ can be substantially reduced. Given uncertainty in sensor accuracy, the dosing may be set e.g. to an amount corresponding to a reduction e.g. in the order 30-40% of the total occurrence of nitrogen oxides $NO_X$ in the exhaust gas stream, to thereby reduce the occurrence of nitrogen dioxide $NO_2$ with a high degree of certainty. The total occurrence may be determined e.g. through the use of a $NO_X$ sensor upstream the first SCR catalytic converter, or a model representation or by any other suitable means.

The relative proportion of nitrogen dioxide $NO_2$ in the exhaust gas stream may be estimated e.g. through a mathematical model or simply assumed to be at most e.g. 15%, where the supply of additive can be adapted according to the determined occurrence of nitrogen dioxide $NO_2$. Consequently, the nitrogen oxides leaving the reduction catalytic converter can be controlled to essentially consist of nitric oxides only.

Furthermore, according to the present embodiment, measurements are performed using $NO_X$ sensor 364 downstream the second SCR catalytic converter 332. Therefore, in the present example, also in step 203, supply of additive to the second SCR catalytic converter 332 is turned off and stored reagent/additive allowed to be consumed, prior to performing measurements so as to essentially eliminate reduction of nitrogen oxides in the reduction catalytic converter to thereby ensure that presence of nitrogen oxides downstream the second SCR catalytic converter 332 is the same or essentially the same as upstream the SCR catalytic converter 332. According to embodiments of the invention, a $NO_X$ sensor upstream the second SCR catalytic converter 332 is used instead, such as $NO_X$ sensor 363 of FIG. 3. In this case, supply of additive to the second SCR catalytic converter 332 may continue during measurements according to the invention.

The method then continues to step 203 where a first measurement of the occurrence of nitrogen oxides in the exhaust gas stream is performed using a $NO_X$ sensor upstream the oxidation catalytic converter but downstream the SCR catalytic converter 331 e.g. through the use of $NO_X$ sensor 362 of FIG. 2. Furthermore, a first measurement using a second $NO_X$ sensor, in this case $NO_X$ sensor 364. Hence, in step 204 first measurement of the occurrence of nitrogen oxides is performed for each of said sensors 362, 364.

Due to the supply of additive for reducing nitrogen dioxide $NO_2$ in the exhaust gas stream through the use of the first SCR catalytic converter and the performing of the measurements at a low temperature, and reduction in SCR catalytic converter 332 turned off, sensors 362 and 364 measure on essentially the same exhaust gas stream which further essentially comprises only nitric oxides NO.

These measurements at or below the low temperature T1 can be used to determine a difference in sensor accuracy of the sensors 362, 364. That is, even though the sensors measure on essentially the same exhaust gas stream with regard to nitrogen oxide content the sensors may still provide different results. This is because sensor accuracy may differ. The sensors may indicate too high or too low occurrences, and one of the sensors 362, 364 may indicate a higher than actual presence of nitrogen oxides while the other sensors e.g. may provide a measurement indicating a lower than actual presence of nitrogen oxides. Deviations in sensor accuracy may e.g. be up to 15% in either direction with the result that measurement results from the sensors may exhibit a substantial relative difference. The first measurements of the $NO_X$ sensors 362, 364, therefore, can be utilized to determine a representation of a difference in measurement accuracy between the sensors. Consequently, further measurements can be compensated for such differences in accuracy, so that any differences in compensated measurement results indicate actual differences in the occurrence of nitric oxides in the exhaust gas stream.

According to the present example, this compensation is explicitly determined in step 205 but according to embodiments of the invention such compensation may be performed as an integrated part of calculations following a second measurement below.

The method then continues to step 206 where it is determined whether representation of the temperature of the oxidation catalytic converter is equal to or exceeds a second temperature T2. The second temperature T2 may be a temperature where it is expected that oxidation of nitric oxide NO into nitrogen dioxide $NO_2$ in the oxidation catalytic converter 310 occurs at least to a predetermined extent. As was mentioned above, the ability to oxidize nitric oxides is highly temperature dependent, but where this temperature dependence in general is relatively well-known so that can be determined that the temperature T2 is a temperature where e.g. at least 20% or more of the nitric oxides NO is expected to be oxidized into nitrogen dioxide $NO_2$.

The method may remain in step 206 for as long as the temperature criterion is not fulfilled. Actions may also be taken to increase the temperature of the oxidation catalytic converter, e.g. by increasing load of the internal combustion engine and/or awaiting driving conditions where the internal combustion engine load is such that the exhaust gas temperature is sufficient to heat the oxidation catalytic converter to a desired extent.

When the condition of step 206 is fulfilled the method continues to step 207 where a second measurement, by each of said $NO_X$ sensors 362, 364, of the occurrence of nitrogen oxide $NO_X$ is performed.

Hence, measurements are performed for two different temperatures, T1, T2 for which different degrees of oxidation by the oxidation catalytic converter is expected. When oxidation of nitric oxides into nitrogen dioxide $NO_2$ is ongoing in the oxidation catalytic converter, the $NO_X$ sensors will provide different results even when the results are compensated for differences in measurement accuracy according to the above. This is due to the fact that sensor sensitivity of a $NO_X$ sensor differs in regard of nitric oxides NO and nitrogen dioxide $NO_2$. For example, it is common that sensor sensitivity is essentially equal to 1 for measurements of nitric oxides NO, but may be as low as e.g. 0.8 for nitrogen dioxide $NO_2$. Hence, if the nitrogen oxides $NO_X$ consists to a large extent of nitrogen dioxide $NO_2$, the sensor signal from sensor 364 will indicate a lower occurrence of nitrogen oxides than when the nitrogen oxides consist to a larger extent of nitric oxide NO, and also than what is indicated by sensor 362, still measuring on the same exhaust gas stream.

In step 208 the capability of the oxidation catalytic converter 310 with regard to oxidation of nitric oxides is evaluated using said first and second measurements, where the first measurements are used to determine a difference in sensor accuracy and the second measurements are used to determine the degree of oxidation.

The more the compensated measurements differ from each other, the higher the assumed oxidation of nitric oxides in the oxidation catalytic converter 310, since the higher the content of nitrogen dioxide $NO_2$, the lower the measurement signal will be. If the sensor signals were not compensated it would be more difficult to determine the performance of the oxidation catalytic converter, since differences in sensor accuracy in itself may render a high uncertainty in the correctness of oxidation catalytic converter evaluation.

The determination according to the invention can, for example, be performed according to the following:

$$\frac{NO_{X,364} K_{364}}{NO_{X,362} K_{362}} = X_{NO} + (1 - X_{NO})0.8$$

Where:
$K_{362}$ is the measurement error of $NO_X$ sensor 362
$K_{364}$ is the measurement error of $NO_X$ sensor 364
$X_{NO}$ the estimated proportion of nitric oxide NO, and
$(1-X_{NO})0.8$ the estimated proportion of nitrogen dioxide $NO_2$, assuming a sensor sensitivity of 0.8.

The measurement error $$K = \frac{K_{364}}{K_{362}}$$

can be determined through said first measurement, and hence $X_{NO}$ from the second measurement. Consequently, the occurrence of nitrogen dioxide $NO_2$ can be determined as $1-X_{NO}$.

When the content of nitrogen dioxide $NO_2$ has been estimated in step 208 it can be determined in step 209 whether this content is sufficient to declare the oxidation catalytic converter as working properly, in which case the method is ended in step 211. If it is considered that oxidation of nitric oxides does not occur to a desired extent, e.g. due to a too low oxidation of nitric oxides NO, the method continues to step 210 where a signal indicating fault can be generated e.g. by setting one or more trouble codes in a vehicle control system. The determination in step 209 can, for example, be based on a model representation of the oxidation catalytic converter 310, where e.g. an expected degree of oxidation can be determined through use of such a model. Alternatively, or in addition, empirical measurements may be used to determined expected oxidation. Also, an age factor may be applied, e.g. to take into account ageing of the oxidation catalytic converter 310.

Furthermore, it is also contemplated that the above method is carried out for a plurality of operating points of the internal combustion engine, e.g. with regard to exhaust gas mass flow or different temperatures, and it may be required that insufficient oxidation is indicated at more than one operating point in order to declare the oxidation catalytic converter is malfunctioning.

The method can be performed for a plurality of different actual temperatures of said second temperature T2 to evaluate oxidation of nitric oxides NO at the different temperatures. Hence steps 206 and onwards can be repeated for different temperatures T2.

As was mentioned above, the diagnose can also be arranged to be carried out for operating points resulting in different mass flows of nitrogen oxides $NO_X$ to evaluate the capability of oxidising nitric oxide NO into nitrogen dioxide $NO_2$ for different mass flows.

Also, the invention has been exemplified above with regard to an oxidation catalytic converter. The invention, however is equally applicable for diagnosing the capability of oxidizing nitric oxides in any kind of aftertreatment components. For example, particle filter or slip catalytic converter or any other kind of aftertreatment components may be provided with means for accomplishing such oxidation e.g. by providing a portion of the aftertreatment components with a layer of suitable precious metal. Hence, the invention is not limited to diagnosing oxidation catalytic converters.

Finally, the present invention has been exemplified for a vehicle. The invention is, however, applicable in any kind of craft, such as, e.g., aircrafts and watercrafts. The invention is also applicable for use in combustion plants. Also, the aftertreatment system may comprise further components such as one or more particle filters, one or more oxidation catalytic converters as is known per se.

The invention claimed is:

1. A method for diagnosing a first aftertreatment component subjected to an exhaust gas stream resulting from combustion in an internal combustion engine, wherein nitrogen oxide in said exhaust gas stream is reduced through the use of a first catalytic converter upstream said first aftertreatment component and a second catalytic converter downstream said first aftertreatment component, said first aftertreatment component being arranged for oxidation of nitric oxide into nitrogen dioxide, wherein a first sensor is arranged to measure an occurrence of nitrogen oxide downstream said first catalytic converter but upstream said first aftertreatment component, and wherein a second sensor is arranged to measure an occurrence of nitrogen oxide downstream said first aftertreatment component, said method comprising:
   supplying additive upstream said first catalytic converter to reduce nitrogen oxide through the use of said first catalytic converter;
   using said first and second sensors, performing a first measurement of the occurrence of nitrogen oxide upstream and downstream said first aftertreatment component at a first temperature of said first aftertreatment component;
   using said first and second sensors, performing a second measurement of the occurrence of nitrogen oxide upstream and downstream said first aftertreatment component at a second, different from said first, temperature of said first aftertreatment component; and
   diagnosing oxidation of nitric oxide into nitrogen dioxide in said first aftertreatment component using said first and second measurements.

2. The method according to claim 1, further including:
   diagnosing said first aftertreatment component by, using said first and second measurements
   determining a representation of a oxidation of nitric oxide into nitrogen oxide in said first aftertreatment component.

3. The method according to claim 1, further including:
   utilizing a first measurement difference between said first measurements of the occurrence of nitrogen oxide as a representation of a difference in measurement signal of said first and second sensors.

4. The method according to claim 1, further including, when diagnosing said first aftertreatment component:
   utilizing a difference in sensor sensitivity of said second sensor regarding sensitivity when sensing presence of nitric oxide and sensitivity when sensing nitrogen dioxide.

5. The method according to claim 1, further including, when diagnosing said first aftertreatment component:
   determining a second measurement difference between said second measurement of said second sensor and said second measurement of said first sensor;
   compensating said second measurement difference through the use of a first measurement difference between said first measurements; and
   diagnosing oxidation of nitric oxide into nitrogen dioxide in said first aftertreatment component on the basis of said second measurement difference.

6. The method according to claim 5, further including:
   following said compensation, determining if said second measurement using said second sensor deviates from said second measurement using said first sensor at least to a first extent; and
   determining that said first aftertreatment component is operating properly when the second measurements using said first and second sensor deviates at least to said first extent.

7. The method according to claim 6, further including, when the sensitivity of said second sensor is higher when detecting occurrence of nitric oxides than when detecting occurrence of nitrogen dioxide:
   determining that said first aftertreatment component is operating properly when, following said compensation, said second measurement of said first sensor exceeds said second measurement of said second sensor at least to said first extent.

8. The method according to claim 1, further including:
determining if an estimated occurrence of nitrogen dioxide in said exhaust gas stream downstream said second catalytic converter is below a predetermined occurrence of nitrogen dioxide; and
determining that said first aftertreatment component is not operating properly when said estimated occurrence of nitrogen dioxide downstream said second catalytic converter is below said predetermined occurrence of nitrogen dioxide.

9. The method according to claim 1, wherein:
said first temperature represents a temperature of said first aftertreatment component at which oxidation of nitric oxide into nitrogen dioxide in said first aftertreatment component occurs to an extent below a first extent, and
wherein said second temperature represents a temperature of said first aftertreatment component at which oxidation of nitric oxide into nitrogen dioxide in said first aftertreatment component occurs to an extent above a second, higher than said first, extent.

10. The method according to claim 1, further including:
performing said first measurements at said first temperature, said first temperature being a representation of a temperature of said first aftertreatment component being so low that essentially no oxidation of nitric oxide into nitrogen dioxide in said first aftertreatment component occurs.

11. The method according to claim 1, further including:
performing said second measurements at said second temperature, said second temperature being a representation of a temperature of said first aftertreatment component being so high that oxidation of nitric oxide into nitrogen dioxide occurs in said first aftertreatment component at least to a first degree of oxidation.

12. The method according to claim 1, further including:
performing said second measurements at said second temperature, said second temperature being a representation of a temperature of said first aftertreatment component being so high that oxidation of nitric oxide into nitrogen dioxide occurs in said first aftertreatment component at least to 40 percent of a maximum oxidation of nitric oxides in said first aftertreatment component.

13. The method according to claim 1, further including:
prior to performing said first and second measurements, controlling reduction of nitrogen oxide in said second catalytic converter such that essentially no reduction occurs in said second catalytic converter.

14. The method according to claim 1, wherein said second sensor is arranged downstream said second catalytic converter.

15. The method according to claim 1, further including:
supplying additive upstream said first catalytic converter at least to an extent sufficient to reduce nitrogen dioxide occurring in said exhaust gas stream upstream said first catalytic converter to essentially zero downstream said first catalytic converter.

16. The method according to claim 1, further including:
determining said first and second measurements for a plurality of operating points of said internal combustion engine; and
determining that said first aftertreatment component is not operating properly when diagnose using said measurements indicate oxidation of nitric oxide into nitrogen dioxide below a first degree of oxidation at a plurality of operating points.

17. The method according to claim 1, further including:
determining said first and second measurements for a plurality of operating points of said internal combustion engine, said plurality of operating points being operating points resulting in different mass flows of nitrogen oxides; and
diagnosing oxidation of nitric oxide into nitrogen dioxide in said first aftertreatment component for said plurality of operating points.

18. The method according to claim 1, further including:
determining said second measurements for a plurality of different temperatures exceeding said first temperature; and
diagnose oxidation of nitric oxide into nitrogen dioxide in said first aftertreatment component for said plurality of different temperatures.

19. A computer program product stored on a non-transitory computer-readable medium, said computer program product for diagnosing an exhaust gas processing configuration for diagnosing a first aftertreatment component subjected to an exhaust gas stream resulting from combustion in an internal combustion engine, wherein nitrogen oxide in said exhaust gas stream is reduced through the use of a first catalytic converter upstream said first aftertreatment component and a second catalytic converter downstream said first aftertreatment component, said first aftertreatment component being arranged for oxidation of nitric oxide into nitrogen dioxide, wherein a first sensor is arranged to measure an occurrence of nitrogen oxide downstream said first catalytic converter but upstream said first aftertreatment component, and wherein a second sensor is arranged to measure an occurrence of nitrogen oxide downstream said first aftertreatment component, said computer program product comprising computer instructions to cause one or more electronic control units or computers to perform the following operations:
supplying additive upstream said first catalytic converter to reduce nitrogen oxide through the use of said first catalytic converter;
using said first and second sensors, performing a first measurement of the occurrence of nitrogen oxide upstream and downstream said first aftertreatment component at a first temperature of said first aftertreatment component;
using said first and second sensors, performing a second measurement of the occurrence of nitrogen oxide upstream and downstream said first aftertreatment component at a second, different from said first, temperature of said first aftertreatment component; and
diagnosing oxidation of nitric oxide into nitrogen dioxide in said first aftertreatment component using said first and second measurements.

20. A system for diagnosing a first aftertreatment component subjected to an exhaust gas stream resulting from combustion in an internal combustion engine, wherein nitrogen oxide in said exhaust gas stream is reduced through the use of a first catalytic converter upstream said first aftertreatment component and a second catalytic converter downstream said first aftertreatment component, said first aftertreatment component being arranged for oxidation of nitric oxide into nitrogen dioxide, wherein a first sensor is arranged to measure an occurrence of nitrogen oxide downstream said first catalytic converter but upstream said first aftertreatment component, and wherein a second sensor is arranged to measure an occurrence of nitrogen oxide downstream said first aftertreatment component, the system comprising:

means adapted to supply additive upstream said first catalytic converter to reduce nitrogen oxide through the use of said first catalytic converter;

means adapted to, using said first and second sensors, perform a first measurement, respectively, of the occurrence of nitrogen oxide at a first temperature of said first aftertreatment component;

means adapted to, using said first and second sensors, perform a second measurement, respectively, of the occurrence of nitrogen oxide at a second, different from said first, temperature of said first aftertreatment component; and means adapted to diagnose oxidation of nitric oxide into nitrogen dioxide in said first aftertreatment component using said first and second measurements.

21. The system according to claim 20, wherein said first aftertreatment component is (310) being designed for oxidation of nitric oxide into nitrogen dioxide.

22. A vehicle comprises a system for diagnosing a first aftertreatment component subjected to an exhaust gas stream resulting from combustion in an internal combustion engine, wherein nitrogen oxide in said exhaust gas stream is reduced through the use of a first catalytic converter upstream said first aftertreatment component and a second catalytic converter downstream said first aftertreatment component, said first aftertreatment component being arranged for oxidation of nitric oxide into nitrogen dioxide, wherein a first sensor is arranged to measure an occurrence of nitrogen oxide downstream said first catalytic converter but upstream said first aftertreatment component, and wherein a second sensor is arranged to measure an occurrence of nitrogen oxide downstream said first aftertreatment component, the system comprising:

means adapted to supply additive upstream said first catalytic converter to reduce nitrogen oxide through the use of said first catalytic converter;

means adapted to, using said first and second sensors, perform a first measurement, respectively, of the occurrence of nitrogen oxide at a first temperature of said first aftertreatment component;

means adapted to, using said first and second sensors, perform a second measurement, respectively, of the occurrence of nitrogen oxide at a second, different from said first, temperature of said first aftertreatment component; and means adapted to diagnose oxidation of nitric oxide into nitrogen dioxide in said first aftertreatment component using said first and second measurements.

* * * * *